(12) United States Patent
Oroskar et al.

(10) Patent No.: US 9,999,000 B1
(45) Date of Patent: Jun. 12, 2018

(54) MINIMIZING INTERFERENCE CAUSED BY HIGH-POWERED UPLINK TRANSMISSIONS

(71) Applicant: Sprint Spectrum LP, Overland Park, KS (US)

(72) Inventors: Siddharth Oroskar, Overland Park, KS (US); Jasinder Singh, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days. days.

(21) Appl. No.: 15/605,000

(22) Filed: May 25, 2017

(51) Int. Cl.
| | |
|---|---|
| *H04B 7/185* | (2006.01) |
| *H04W 52/24* | (2009.01) |
| *H04W 52/14* | (2009.01) |
| *H04W 72/04* | (2009.01) |
| *H04W 52/36* | (2009.01) |
| *H04W 52/28* | (2009.01) |
| *H04B 7/14* | (2006.01) |
| *H04W 4/00* | (2018.01) |
| *H04W 36/00* | (2009.01) |

(52) U.S. Cl.
CPC ....... *H04W 52/243* (2013.01); *H04W 52/146* (2013.01); *H04W 52/241* (2013.01); *H04W 52/283* (2013.01); *H04W 52/365* (2013.01); *H04W 72/042* (2013.01)

(58) Field of Classification Search
CPC ............. H04W 52/243; H04W 52/244; H04W 52/245; H04W 52/246; H04W 52/247; H04W 52/248; H04W 52/146; H04W 52/24; H04W 52/241; H04W 52/46; H04B 7/15507; H04B 7/155014; H04B 7/14; H04B 10/29
USPC ........................................................ 455/13.1
See application file for complete search history.

(56) References Cited

U.S. PATENT DOCUMENTS

| | | | |
|---|---|---|---|
| 8,315,217 B2 | 11/2012 | Montojo et al. | |
| 9,392,559 B2 | 7/2016 | Zhang et al. | |
| 2015/0092670 A1* | 4/2015 | Makhlouf | ........... H04W 52/265 370/329 |
| 2017/0294951 A1* | 10/2017 | Weissman | ............ H04B 7/0686 |

* cited by examiner

*Primary Examiner* — Huy C Ho (57) ABSTRACT

Systems, methods, and processing nodes for minimizing interference caused by high-powered wireless devices to other wireless devices in the network by determining that a first wireless device assigned to a first power class is located in a potential interference zone of a coverage area of an access node, and deactivating a high-powered transmission mode of the first wireless device. The high-powered transmission mode utilizes a first transmission power level that is associated with the first power class. The potential interference zone is defined based on standard-powered uplink transmissions that have a high noise or low SINR.

19 Claims, 10 Drawing Sheets

MINIMIZING INTERFERENCE CAUSED BY HIGH-POWERED UPLINK TRANSMISSIONS

TECHNICAL BACKGROUND

As wireless networks evolve and grow in complexity, there are ongoing challenges associated with reaching targeted coverage levels. Recently, in an effort to boost coverage and enhance throughput in wireless networks, network operators have proposed deployment of wireless devices capable of transmitting at a maximum allowable transmit power that is higher than a current maximum allowable transmit power of off-the-shelf wireless devices and/or other currently deployed standard or low powered wireless devices.

As shown in Table 1 below, the maximum allowable transmit power for wireless devices can be defined by the power class of the wireless device.

TABLE 1

| Operating Band | Power Class 1 Wireless Device | | Power Class 2 Wireless Device | | Power Class 3 Wireless Device | | Power Class 4 Wireless Device | |
|---|---|---|---|---|---|---|---|---|
| | Power (dBm) | Tol. (dB) | Power (dBm) | Tol. (dB) | Power (dBm) | Tol. (dB) | Power (dBm) | Tol. (dB) |
| Band I | 31 | ±2 | 26 | ±2 | 23 | ±2 | 21 | ±2 |
| Band II | — | — | 26 | ±2 | 23 | ±2 | 21 | ±2 |
| Band III | — | — | — | — | 23 | ±2 | 21 | ±2 |

For example, the maximum allowable transmit power level and tolerance (i.e., power error limits) with which wireless devices can transmit data on a given frequency band or sub-band (e.g., bands I-III) can be specified based on a pre-defined power class (e.g., power classes 1-4 illustrated in Table 1) of the wireless device rather than a physical maximum transmit capability of the wireless device. Off-the-shelf and/or other standard-powered (or low-powered) wireless devices are currently defined in LTE as power class 3 and/or power class 4 wireless devices. Power class 3 and/or power class 4 low-powered wireless devices can be configured with a maximum allowable transmit power level of +23 dBm for frequency bands I-III with a nominal power tolerance of ±2 dB (e.g., for E-UTRA bands). High-powered wireless devices are currently defined as power class 1 or power class 2 wireless devices. Power class 1 and/or power class 2 high-powered wireless devices can be configured with a maximum allowable transmit power level of +26 dBm for frequency bands I-II with a nominal power tolerance ±2 dB (e.g., for E-UTRA bands), as illustrated in Table 1.

Introducing additional high-powered wireless devices into a wireless network can negatively affect uplink system performance. For example, transmissions from standard-powered wireless devices (uplink transmissions) as well as signals received at the standard-powered wireless devices (downlink transmissions) may each be subject to interference caused by uplink transmissions from high-powered wireless devices operating in a high-powered transmission mode, particularly when both standard and high-powered wireless devices are operating on the same frequency band or sub-band.

OVERVIEW

Exemplary embodiments described herein include systems, methods, and processing nodes for minimizing interference that may potentially be caused by high-powered wireless devices to other wireless devices in the network. Exemplary methods for minimizing interference in a wireless network include determining that a first wireless device assigned to a first power class is located in a potential interference zone of a coverage area of an access node, and deactivating a high-powered transmission mode of the first wireless device. The high-powered transmission mode utilizes a first transmission power level that is associated with the first power class.

Exemplary systems for minimizing interference in a wireless network include a processing node that is configured to perform operations including determining a coverage area within which an access node can receive uplink transmissions transmitted using a first transmit power level, and deactivating a high-powered transmission mode for one or more wireless devices using a second transmit power level that are within the coverage area. The second transmit power level is higher than the first transmit power level.

Exemplary processing nodes for minimizing interference in a wireless network are configured to perform operations including identifying a high-powered wireless device (HPUE) in a potential interference region of a coverage area of an access node, deactivating a high-powered transmission mode of the HPUE, determining that the HPUE moves outside the potential interference region, and activating the high-powered transmission mode.

DETAILED DESCRIPTION

Exemplary embodiments herein disclose methods, systems, and processing nodes for minimizing interference caused by high-powered wireless devices by deactivating a high-powered transmission mode of the high-powered wireless devices when they are located within a potential interference zone. The potential interference zone may be defined as a region of a coverage area of one or more access nodes where there is a potential for interference caused to standard-powered (and other) wireless devices attached to the one or more access nodes. Thus, the region comprised by the potential interference zone may be defined based on locations of standard-powered wireless devices reporting poor signal conditions. For any high-powered wireless devices within the defined potential interference zone, a high-powered transmission mode thereof is automatically deactivated. These and other operations are further described below with respect to the embodiments depicted in FIGS. 1-9.

Figure 1:
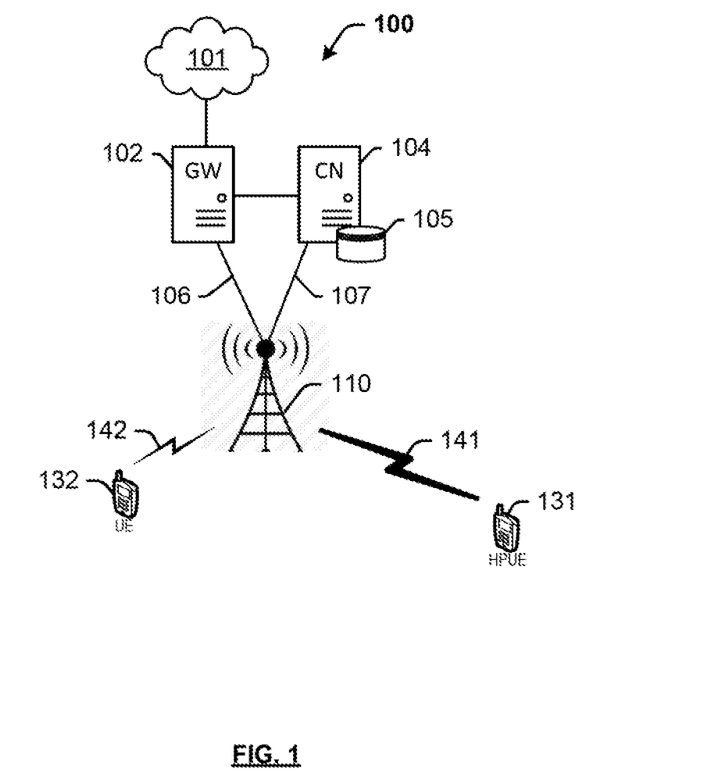
FIG. 1 depicts an exemplary system for minimizing interference in a wireless network.
Figure 8A:
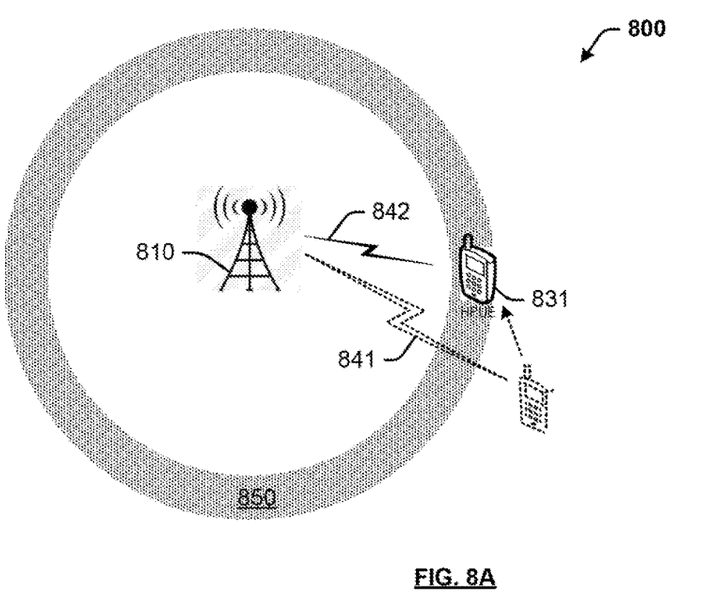
FIGS. 8A-8B depict an exemplary system for deactivating a high-powered transmission mode for a high-powered wireless device entering a potential interference zone of an access node.
Figure 8B:
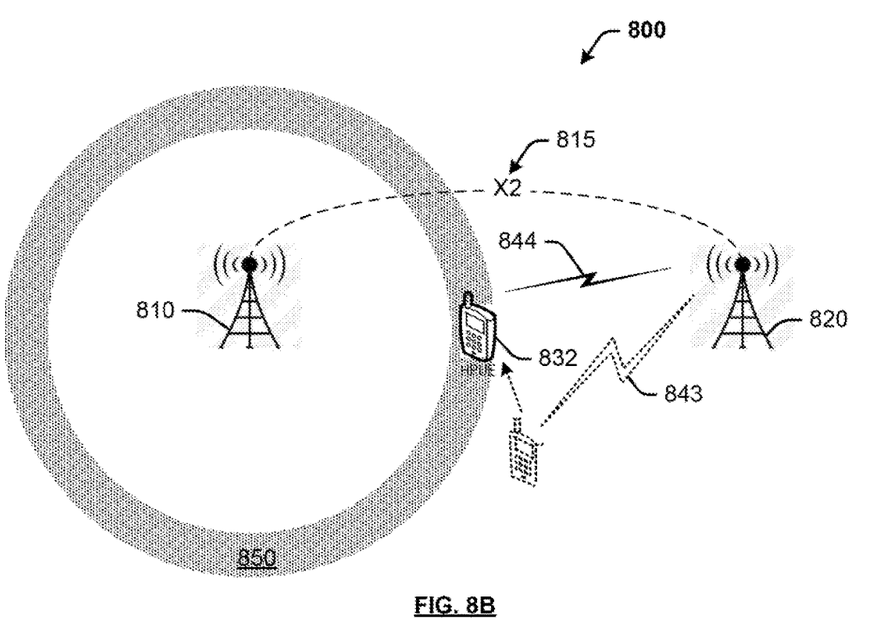

FIG. 1 depicts an exemplary system 100 for minimizing interference in a wireless network. System 100 comprises a communication network 101, gateway 102, controller node 104, access node 110, and end-user wireless devices 131 and 132. Wireless devices 131, 132 are illustrated as accessing network services from access node 110 via communication links 141, 142 respectively. Wireless device 131 may be assigned a higher transmission power class, such as power class 1 or 2, and wireless device 132 may be assigned a standard or low transmission power class, such as power class 3 or 4. Thus, high-powered wireless device 131 is illustrated as operating in a high-powered transmission mode, such that communication link 141 utilizes a transmission power typically assigned to high-powered wireless devices, enabling high-powered wireless device 131 is able to communicate with access node 110 over a longer distance than standard-powered wireless device 132. Further, standard-powered wireless device 132 is illustrated as operating in a standard-powered transmission mode, such that communication link 142 utilizes a standard transmission power. Although only access node 110 and wireless devices 131, 132 are illustrated in system 100, additional access nodes and wireless devices may be contemplated by those having ordinary skill in the art in light of this disclosure. See, for instance, FIG. 8 and its associated description. In operation, interference that may be caused by high-powered wireless device 131 to standard-powered wireless device 132 (i.e. potential interference) is minimized by defining a potential interference zone around access node 110, and deactivating a high-powered transmission mode of high-powered wireless device 131 when it enters the potential interference zone, as further described herein.

Access node 110 can be any network node configured to provide communication between wireless devices 131, 132 and communication network 101, including standard access nodes and/or short range, low power, small access nodes. For instance, access node 110 may include any standard access node, such as a macro-cell access node, base transceiver station, a radio base station, an eNodeB device, an enhanced eNodeB device, or the like. In an exemplary embodiment, a macro-cell access node can have a coverage area in the range of approximately five kilometers to thirty-five kilometers and an output power in the tens of watts. In another embodiment, access node 110 can be a small-cell access node including a microcell access node, a picocell access node, a femtocell access node, or the like such as a home NodeB or a home eNodeB device.

Access node 110 can comprise a processor and associated circuitry to execute or direct the execution of computer-readable instructions to perform operations such as those further described herein. Briefly, access node 110 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access node 110 can receive instructions and other input at a user interface. Access node 110 communicates with gateway node 102 and controller node 104 via communication links 106, 107. Access node 110 may communicate with other access nodes (not shown) using a direct link such as an X2 link or similar. Components of exemplary access nodes are further described with reference to FIG. 2.

Wireless devices 131, 132 may be any device, system, combination of devices, or other such communication platform capable of communicating wirelessly with access node 110 using one or more frequency bands deployed therefrom. Each of wireless devices 131, 132 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access node 110. Other types of communication platforms are possible. Components of exemplary wireless device and transmission power capabilities thereof are further described with reference to FIG. 3.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 131, 132. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Communication links 106, 107 may include S1 communication links. Other wireless protocols can also be used. Communication links 106, 107 can be a direct link or might include various equipment, intermediate components, systems, and networks. Communication links 106, 107 may comprise many different signals sharing the same link.

Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as Long Term Evolution (LTE) and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information related to elements within system 100, such as locations, power class assignments, and transmission mode capabilities of wireless devices 131, 132, presence and transmit power allowances of access node 110, and so on. This information may be requested by or shared with access node 110 via communication links 106, 107, X2 connections, and so on. The software comprises computer programs, firmware, or some other form of machine-readable instructions, and may include an operating system, utilities, drivers, network interfaces, applications, or some other type of software, and combinations thereof. Controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

Figure 2:
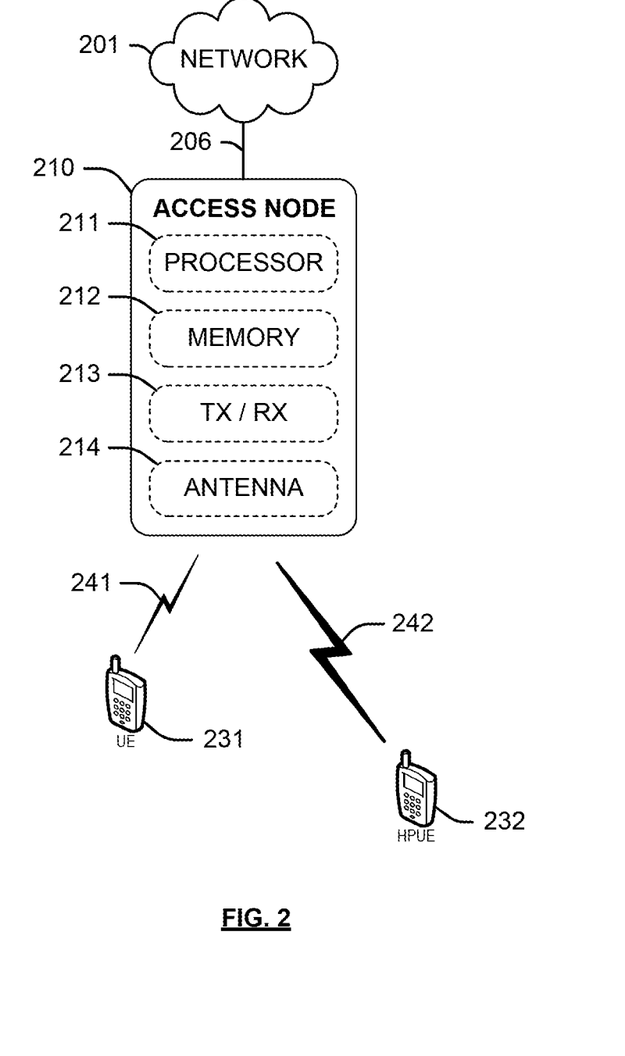
FIG. 2 depicts an exemplary access node.

FIG. 2 depicts an exemplary access node 210 for minimizing interference. Access node 210 may comprise, for example, a macro-cell or a small-cell access node, such as access node 110 described with reference to FIG. 1. Access node 210 provides wireless devices 231, 232 with access to network services and applications on network 201. Access node 210 is illustrated as comprising a processor 211, memory 212, transceiver 213, and antenna 214. Processor 211 executes instructions stored on memory 212, while transceiver 213 and antenna 214 enable communication with wireless devices 232, 234 over communication links 242, 244, respectively. Instructions stored on memory 212 can include instructions for determining a potential interference zone within a coverage area of access node 210 based on a signal-to-interference-plus-noise ratio (SINR) of uplink transmissions from one or more standard-powered wireless devices, such as standard-powered wireless device 231 utilizing a standard-powered communication link 241. The potential interference may be caused by high-powered transmissions from high-powered wireless device 232 utilizing high-powered communication link 242. Thus, the SINR includes any measure of a ratio between a signal from wireless device 231 and noise from other network nodes operating as same frequency, such as high-powered wireless device 232, and other devices and/or access nodes. Instructions in memory 212 further include monitoring a location of high-powered wireless device 232 and, if the location falls within the potential interference zone, to deactivate the high-powered transmission mode for high-powered wireless device 232.

Figure 3:
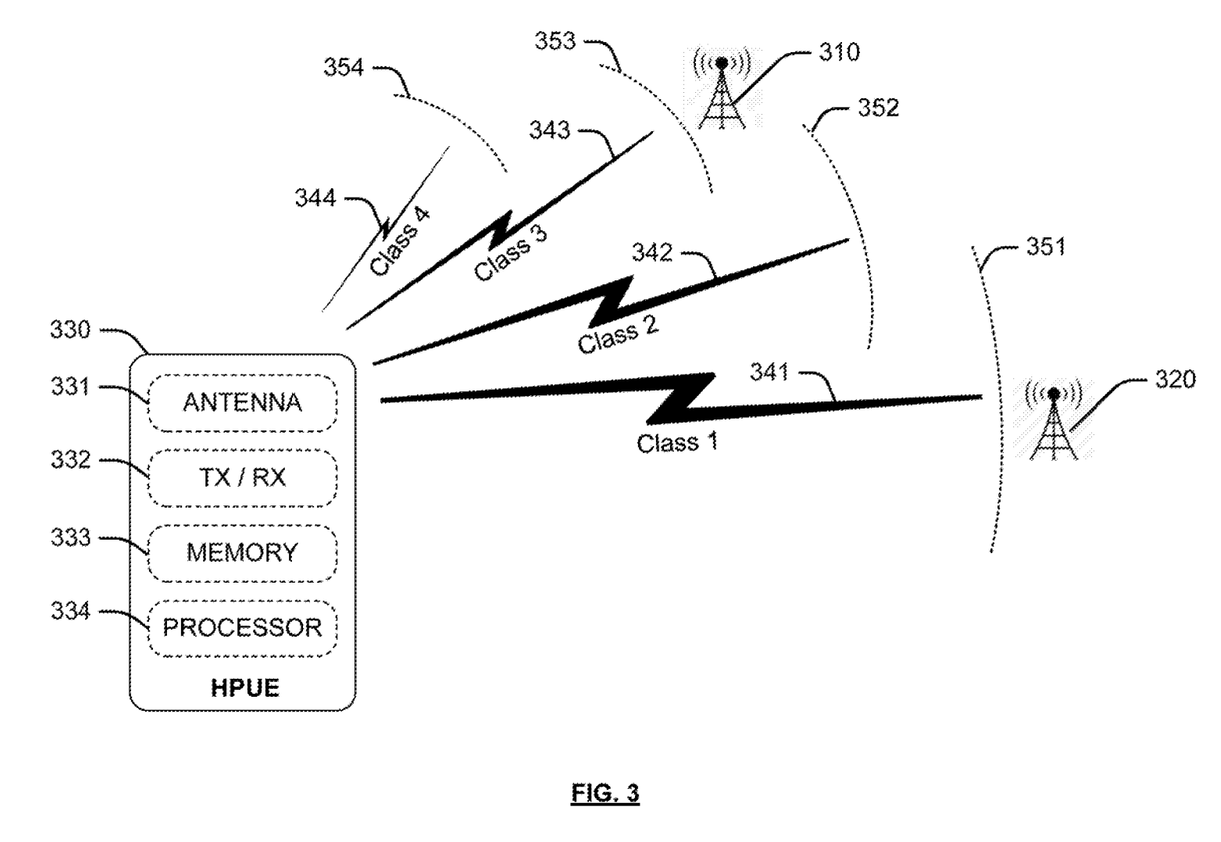
FIG. 3 depicts an exemplary wireless device utilizing a plurality of transmission power classes.

FIG. 3 depicts an exemplary wireless device 330 capable of transmission in several power classes. As noted above, wireless devices can be configured as different power class wireless devices (e.g., high-powered wireless devices and/or standard-power wireless devices as well as low-power wireless devices). Wireless device 330 is therefore equipped with an appropriate antenna 331 and transceiver 332 enabling increased transmit power from wireless device 330 to one or more access node 310, 320. For example, wireless device 330 is capable of operating in a transmission mode utilizing power class 1, which enables uplink transmission 341 at a range 351. Wireless device 330 may further switch transmission modes to utilizing power class 2 to transmit uplink transmission 342 at a range 352, utilizing power class 3 to transmit uplink transmission 343 at a range 353, and utilizing power class 4 to transmit uplink transmission 344 at a range 354. Antenna 331 and transceiver 332 are appropriately configured to utilize these differently-powered transmission modes.

Further, the range of the uplink transmissions 341-344 can affect an effective coverage area of an access node. For example, the effective coverage area of an access node, such as one of access nodes 310, 320, can be limited by an amount of power available to wireless device 330. Thus, when wireless device 330 operates in a high-powered transmission mode, it can communicate with access nodes from a longer distance than standard-power wireless devices. For example, when wireless device is assigned power class 3, uplink transmission 343 is transmitted at a power level that enables communication with access node 310 at range 353. To communicate with access node 320, which is further away from wireless device 330 (i.e. at range 351), wireless device 330 may be assigned power class 1, which enables a higher-powered uplink transmission 341. Consequently, real-time adjustment of the power classes of wireless devices such as wireless device 330 can be performed by network operators to increase the effective coverage area of their access nodes, enabling more consumers will to use a given access node. Moreover, controlling the transmit power level or changing the power class of wireless device 330 can be performed by setting a maximum uplink transmission power value allowed by a serving access node to be equal to a standard maximum uplink transmission power value associated with standard-powered wireless devices, and broadcasting the standard maximum uplink transmission power value to wireless device 330 via a system information message such as, for example, a downlink control indicator (DCI) message.

Figure 4:
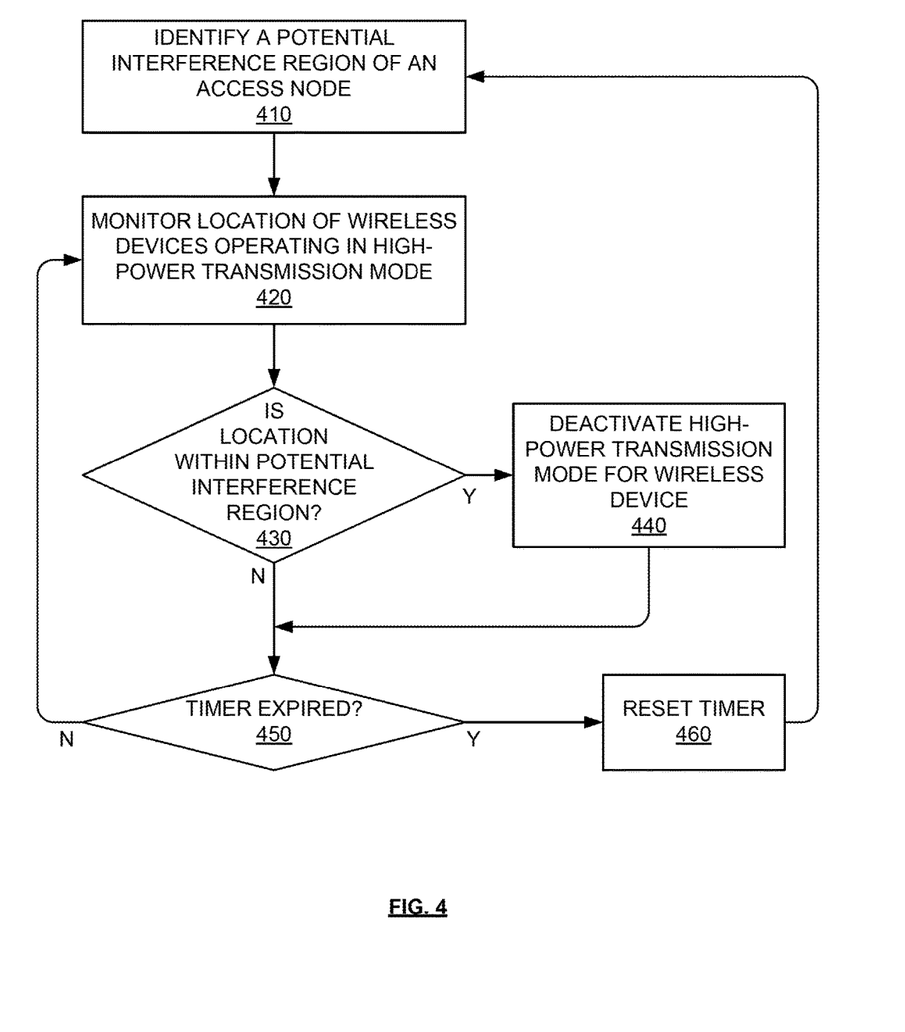
FIG. 4 depicts an exemplary method for minimizing interference in a wireless network.

FIG. 4 depicts an exemplary method for minimizing interference in a wireless network. The method of FIG. 4 may be implemented by an access node such as access node 110, by a controller node such as controller node 104, or by any other network node. Although FIG. 4 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 410, a potential interference zone is identified for an access node. The potential interference zone may be defined as a region of a coverage area of an access node where there is a potential for interference caused to standard-powered (and other) wireless devices attached to the access node. For example, a coverage area is determined within which uplink transmissions with low SINR values are received at the access node from one or more standard-powered wireless devices. The access node may determine that the received SINR values are below a threshold. Standard-powered wireless devices may be configured to report SINR values, or only SINR values for each uplink transmission. In either case, a subset of the uplink transmissions that have a low SINR, and the potential interference zone may be defined as a region of the coverage area where the SINR of uplink transmissions meets a SINR threshold. Identifying the potential interference zone is further described with reference to FIG. 5.

At 420, a location is monitored for each of the high-powered wireless devices and compared with the potential interference zone. The location may be monitored based on periodic measurements reported from each high-powered wireless device. Alternatively or in addition, the location is obtained from any other method such as retrieving locations from (and sharing locations with) other access nodes or a controller node in communication with each access node. If, at 430, the monitored location matches a location with the potential interference zone, the high-powered transmission mode is deactivated at 440, as further described herein. If, at 430, the monitored location does not match the potential interference zone, then expiration of a timer is monitored at 450. If the timer has not expired, the method loops to operation 420 monitoring high-powered wireless devices, enabling ongoing monitoring 430 and deactivating 440. If the timer is expired, then the timer is reset at 460, and the method loops back to identifying the potential interference zone of the access node 410. Commands to deactivate the high-powered transmissions may be communicated with other access nodes. Thus, interference caused from high-powered transmissions is mitigated continuously by the wireless network based on real-time determination of potential interference zones within the wireless network.

Figure 5:
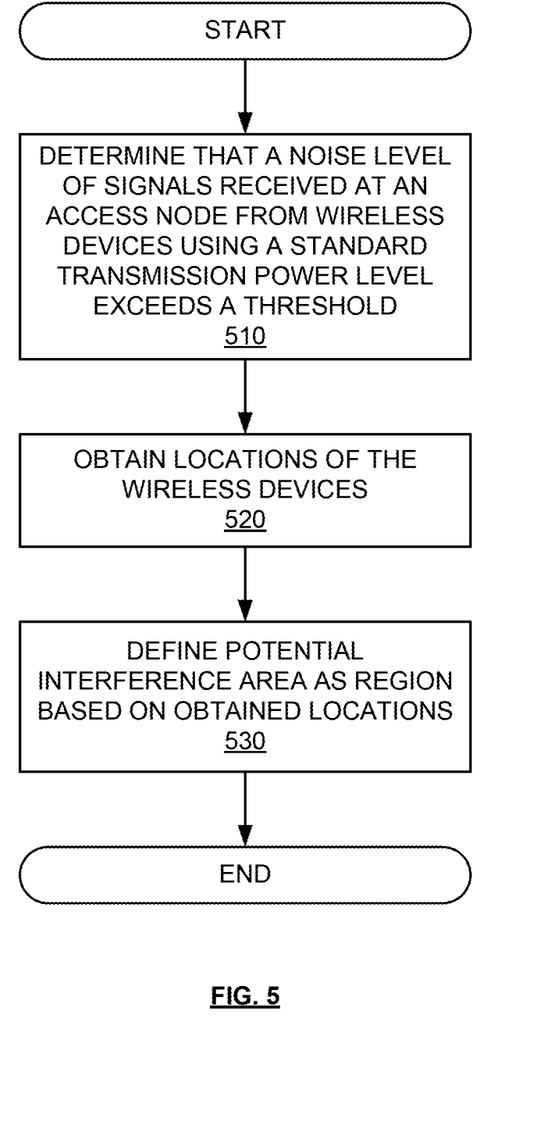
FIG. 5 depicts an exemplary method for defining a potential interference zone of an access node.

FIG. 5 depicts an exemplary method for defining a potential interference zone of an access node. The method of FIG. 5 may be implemented by an access node such as access node 110, by a controller node such as controller node 104, or by any other network node. Although FIG. 5 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 510, a noise level for one or more uplink signals received from wireless devices attached to an access node is determined to meet or exceed a predefined threshold. For example, uplink transmissions from one or more standard-powered wireless devices may include SINR measurements thereof. Alternatively or in addition, the SINR may be measured at the receiving (i.e. serving) access node. In either case, standard-powered wireless devices suffering from low SINR may be identified as sources of the corresponding set of noisy transmissions.

At 520, locations of each source wireless devices (i.e. the subset of standard-powered wireless devices suffering from uplink interference) are obtained or approximated. The locations may be obtained from querying each of the subset of wireless devices transmitting the low SINR signals. The locations may simply be based on the SINR level itself, with predefined SINR levels being associated with a distance from the serving access node. Alternatively or in addition, the locations are obtained from any other method such as retrieving locations from (and sharing locations with) other access nodes or a controller node in communication with each access node, thereby enabling balancing load with power at the network level.

At 530, the potential interference zone is defined as a region of the coverage area comprised by the locations obtained in 520. As described above, the potential interference zone identifies regions of the wireless network in which there exists a potential for interference. The regions of the wireless network associated with a high amount of locations suffering from noise are included within the potential interference zone. In an exemplary embodiment, a threshold number of standard-powered wireless devices may identified in steps 510-520 and associated with specific locations, upon which the specific locations are identified or labeled as potential interference zones. Furthermore, the potential interference zone may be defined as a range comprising a plurality of such locations.

Figure 6:
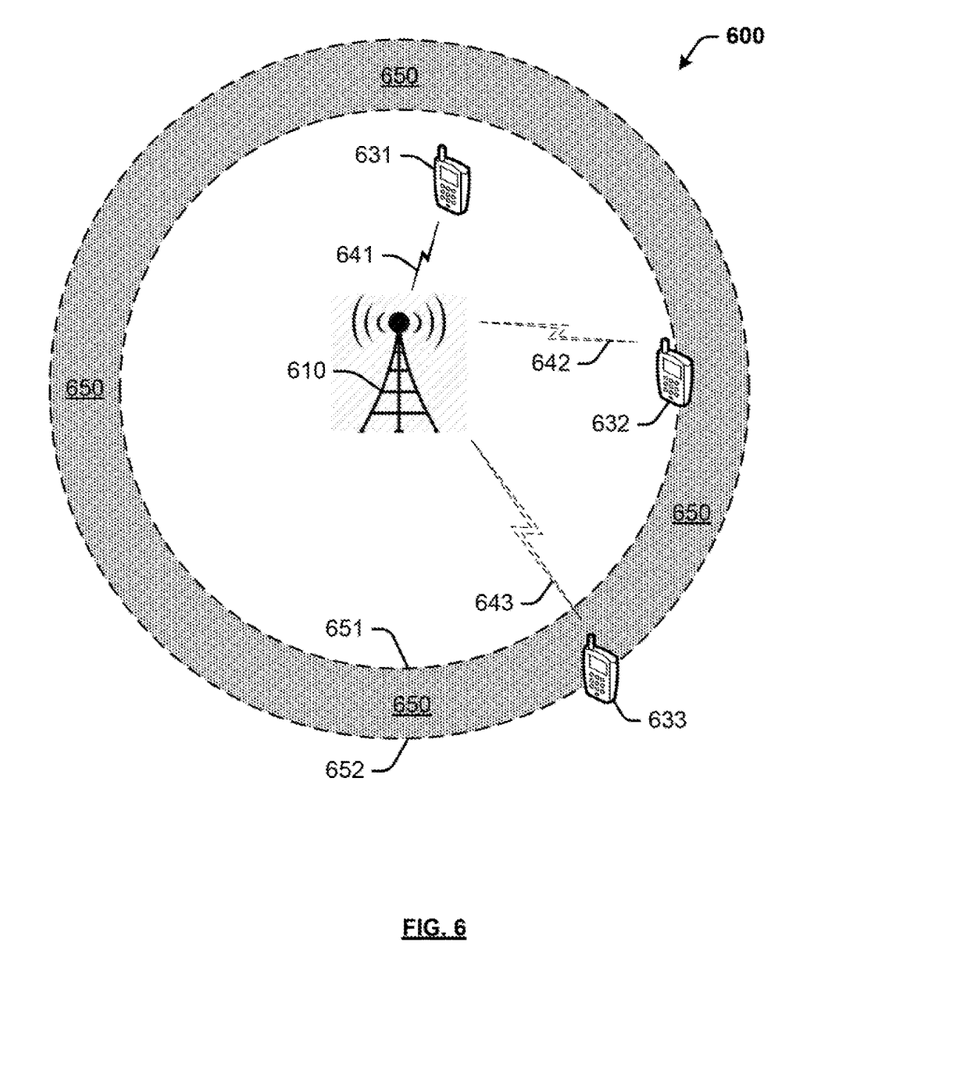
FIG. 6 depicts an exemplary potential interference zone of an access node.

FIG. 6 depicts an exemplary system 600 for identifying a potential interference zone 650 of an access node 610. System 600 depicts wireless devices 631, 632, and 633 communicating with serving access node 610 over communication links 641, 642, and 643, respectively. Access nodes 610 may be considered equivalent to access node 110 in system 100, and wireless devices 631-632 may generally be considered equivalent to standard-powered wireless device 132 in system 100. Other network elements may be present to facilitate communication but are omitted for clarity, such as controllers, gateways, and physical and/or wireless data links for carrying data among the various network elements.

In this embodiment, a noise level for communication links 641, 642, and 643 is used to define potential interference zone 650. For example, noise levels for uplink signals received from each of wireless devices 631, 632, 633 are determined to meet or exceed a predefined threshold. The noise levels may be based on a SINR measurements performed at the wireless device or at serving access node 610. For example, wireless communication link 641 is depicted as including signals transmitted with a good SINR, while wireless communication links 642 and 643 are depicted as including signals transmitted with poor SINR. Thus, wireless devices 632 and 633 that are suffering from a low SINR may be identified as sources of the corresponding set of noisy transmissions.

Since wireless devices 632 and 633 are identified as being a source of noisy communication 642, 643, respectively, their location is obtained, and a potential interference zone 650 is defined based thereon. The locations may be obtained from querying each of wireless devices 632, 633 transmitting the low SINR signals. The locations may simply be based on the SINR level itself, with predefined SINR levels being associated with a distance from the serving access node. Alternatively or in addition, the locations are obtained from any other method such as retrieving locations from (and sharing locations with) other access nodes or a controller node in communication with each access node, thereby enabling balancing load with power at the network level.

Thus, potential interference zone 650 is illustrated as a range between a first boundary 651 defined at a distance of wireless device 632 from access node 610, and a second boundary 652 defined at a distance of wireless device 633 from access node 610. In other words, based on the SINR of signals 642, 643, distances of wireless devices 632, 633 are determined from access node 610, with the distances represented by radii 651 and 652. As described above, potential interference zone 650 identifies regions of the wireless network in which there exists a potential for interference. The regions of the wireless network associated with a high amount of locations suffering from noise are included within the potential interference zone. In an exemplary embodiment, a threshold number of standard-powered wireless devices 631-633 may identified and associated with specific locations, upon which the specific locations are identified or labeled as potential interference zones. Furthermore, the potential interference zone may be defined as a range comprising a plurality of such locations. In exemplary embodiments, a potential interference zone is not necessarily defined around an access node, but may be defined anywhere within a system of access nodes or coverage area of a wireless network, as would be evident to those having ordinary skill in the art in light of this disclosure.

Figure 7:
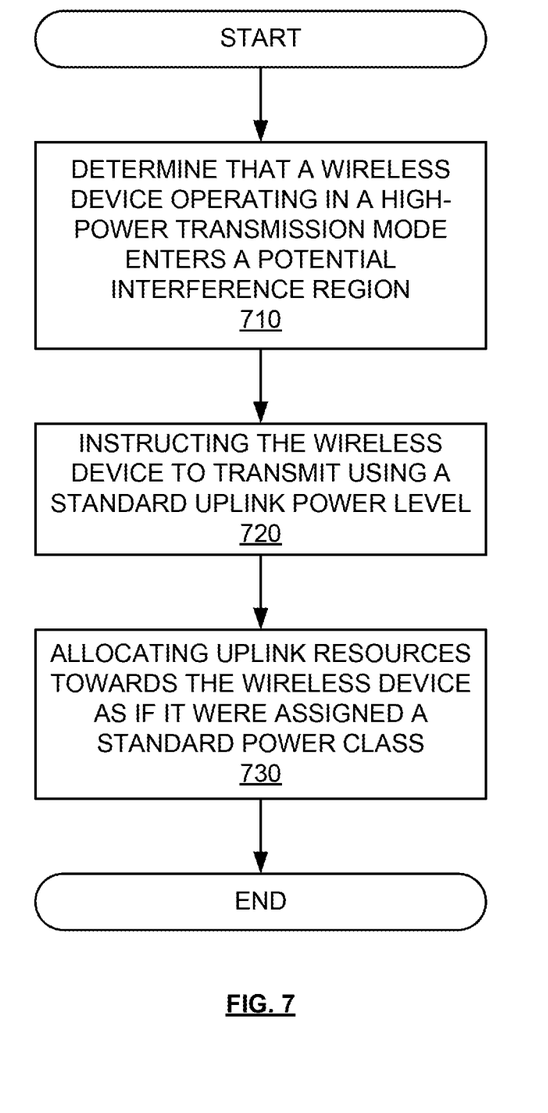
FIG. 7 depicts an exemplary method for deactivating a high-powered transmission mode of a wireless device.

FIG. 7 depicts an exemplary method for deactivating a high-powered transmission mode of a wireless device. The method of FIG. 7 may be implemented by an access node such as access node 110, by a controller node such as controller node 104, or by any other network node. Although FIG. 7 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

The method begins at 710 with a determination that a high-powered wireless device operating in a high-powered transmission mode enters a potential interference zone. For example, as described herein, a location for each of the high-powered wireless devices may be monitored and compared with a potential interference zone. The location may be monitored based on periodic measurements reported from each high-powered wireless device. Alternatively or in addition, the location is obtained from any other method such as retrieving locations from (and sharing locations with) other access nodes or a controller node in communication with each access node. If the monitored location matches a location with the potential interference zone, the high-powered transmission mode is deactivated in steps 720 and 730.

At 720, the wireless device operating in a high-powered transmission mode and determined to be located within the potential interference zone is instructed to utilize a standard-powered uplink transmission level. The standard maximum transmission power level may be associated with a lower power class, such as one of power classes 3 or 4. The standard maximum transmission power level may be transmitted to the high-powered wireless device in a system information message such as, for instance, a downlink control indicator message.

Further, at 730, uplink resources are allocated towards the high-powered wireless device as if it were assigned a standard power class. In other words, the scheduling unit of an access node discards or ignores the power class of the high-powered wireless device, and allocates resources to the high-powered wireless device as if it were in a lower power class (such as, for instance, power class 3 or 4). For example, a smaller amount of uplink resources may be scheduled for standard-powered wireless devices, given their lack of available power headroom to utilize large amounts of resources for uplink transmission. An available power headroom level may be received in a power headroom report from the high-powered wireless device. The available power headroom level reported by the high-powered wireless device may be limited based on the standard maximum transmission power level, rather than on the boosted transmission power level typically enabled by the higher power classes. Further, a modulation and coding scheme (MCS) associated with the lower power class may be assigned to the high-powered wireless device. Specifically, an MCS assigned based on the smaller amount of resources and the standard transmission power level may be lower than a MCS typically assigned to high-powered wireless devices operating in a high-powered transmission mode. Thus, the high-powered operating mode is deactivated, and the high-powered wireless device is treated as if it were a standard-powered wireless device.

Optionally, upon determining that a high-powered wireless device leaves the coverage area, the high-powered transmission mode is activated. Activating the high-powered transmission mode can include allowing a high maximum transmit power for the high-powered wireless device, assigning more uplink resources to the high-powered wireless device, and assigning a higher MCS to the high-powered wireless device. In other words, uplink resources are assigned to the high-powered wireless device in accordance with the high power class, such as power class 1 or 2.

FIGS. 8A-8B depict an exemplary system 800 for deactivating a high-powered transmission mode for a high-powered wireless device entering a potential interference zone of an access node. Both FIGS. 8A and 8B illustrate a high-powered wireless device 831 moving into a potential interference zone 850 around access node 810. Access nodes 810 and 820 may be considered equivalent to access node 110 in system 100, and wireless devices 831, 832 may generally be considered equivalent to high-powered wireless device 131 in system 100. Other network elements may be present to facilitate communication but are omitted for clarity, such as controllers, gateways, and physical and/or wireless data links for carrying data among the various network elements. Further, potential interference zone 850 may have been previously defined (or continuously defined on an ongoing basis) based on uplink transmissions from standard-powered wireless devices, not shown in this embodiment but described in detail with reference to FIGS. 5-6.

With reference to FIG. 8A, high-powered wireless device 831 is illustrated as being in communication with access node 810. While high-powered wireless device 831 is outside potential interference zone 850, it communicates with access node 810 via high-powered uplink transmissions 841. High-powered uplink transmissions 841 may be necessary for high-powered wireless device 831 to communicate with access node 810 based on, for example, a distance from access node 810. However, upon entering potential interference zone 850, a high-powered transmission mode for wireless device 831 is deactivated as described above, and wireless device 831 is instructed to transmit uplink transmissions 842 using a standard power level.

Alternatively, in a system comprising a plurality of access nodes, there may exist a potential for interference caused to wireless devices attached to neighboring access nodes that may be utilizing a common frequency band or sub-band. In such embodiments, each of the two or more neighboring access nodes may monitor the number of wireless devices attached thereto, and communicate this information in real-time to the other access nodes via a communication link such as, for instance, an X2 link. Therefore, with reference to FIG. 8B, high-powered wireless device 832 is illustrated as being in communication with access node 820. Further, access nodes 810 and 820 are illustrated as being in direct communication with each other over a communication link 815, such as an X2 communication link. While high-powered wireless device 832 is outside potential interference zone 850, it communicates with access node 820 via high-powered uplink transmissions 843. High-powered uplink transmissions 843 may be necessary for high-powered wireless device 832 to communicate with access node 820 based on, for example, a distance from access node 820.

However, upon entering potential interference zone 850 of access node 810, a high-powered transmission mode for wireless device 832 is deactivated, and wireless device 832 is instructed to transmit uplink transmissions 844 using a standard power level. In this case, one or both of access nodes 810 and 820 may determine that wireless device 832 has entered a potential interference zone 850. For example, access node 810 may have defined potential interference zone 850 based on uplink transmissions received thereto, and communicated information regarding potential interference zone to access node 820 via X2 link 815. Alternatively or in addition, a processing node communicatively coupled to each of access nodes 810 and 820 may be utilized to monitor the high-powered wireless devices connected thereto, determine potential interference therefrom, and instruct the access nodes to perform the interference minimization operations described herein.

Figure 9A:
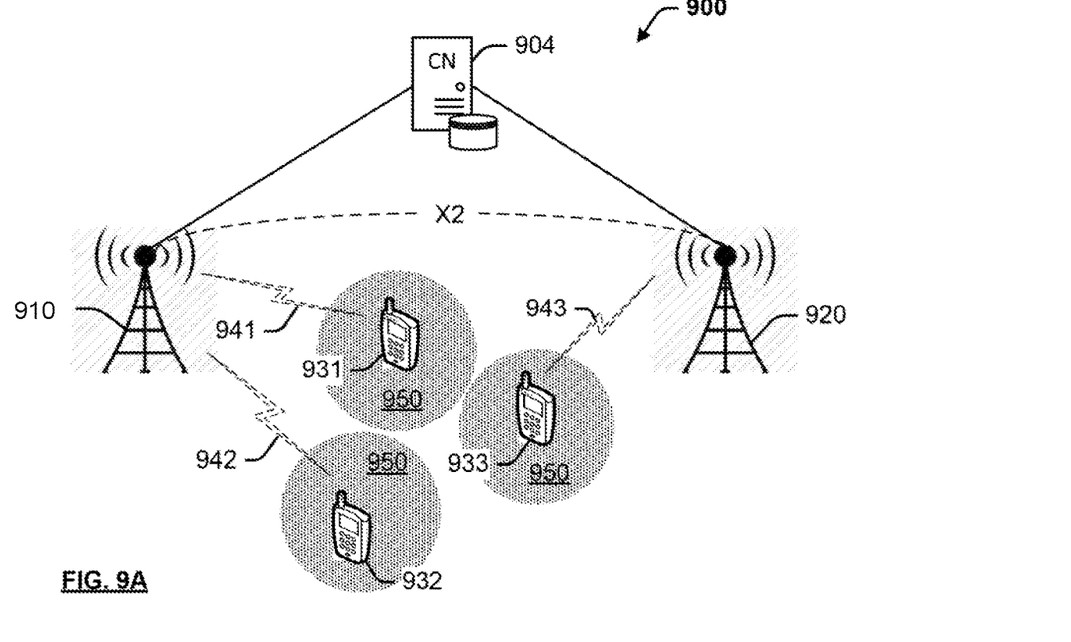
FIGS. 9A-9B depict an exemplary system for deactivating a high-powered transmission mode for a high-powered wireless device entering one or more potential interference zones between a pair of access nodes.
Figure 9B:
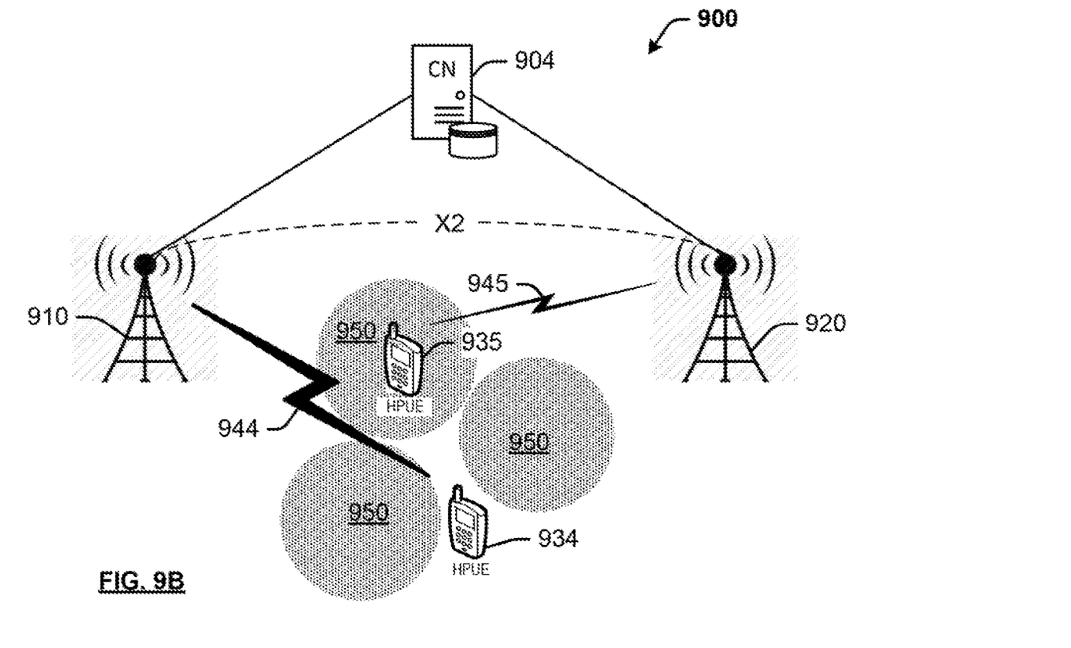

FIGS. 9A-9B depict an exemplary system 900 for deactivating a high-powered transmission mode for a high-powered wireless device entering one or more potential interference zones between a pair of access nodes. FIG. 9A depicts an exemplary system 900 for identifying potential interference zones 950 between access nodes 910, 920. Wireless devices 931 and 932 communicate with serving access node 910 over communication links 941, 942, respectively, and wireless device 933 communicates with serving access node 920 over communication link 943. Access nodes 910, 920 may be considered equivalent to access node 110 in system 100, and wireless devices 931-933 may generally be considered equivalent to standard-powered wireless device 932 in system 100. Other network elements may be present to facilitate communication but are omitted for clarity, such as controllers, gateways, and physical and/or wireless data links for carrying data among the various network elements.

Further, as described in the embodiment of FIG. 6, a noise level for communication links 941, 942, and 943 is used to define potential interference zones 950. Further, in this embodiment, the potential interference zones 950 may be defined as a plurality of locations not necessarily defined around an access node, but defined anywhere within a system of access nodes or coverage area of a wireless network. For example, noise levels for uplink signals received from each of wireless devices 931, 932, 933 are determined to meet or exceed a predefined threshold. The noise levels may be based on a SINR measurements performed at the wireless device or at serving access nodes 910, 920. For example, wireless communication links 941, 942, and 943 are depicted as including signals transmitted with poor SINR. Thus, a location is obtained for the corresponding wireless devices, and potential interference zones 950 are defined based thereon. The locations may be shared between access nodes 910, 920, thereby enabling balancing load with power at the network level.

FIG. 9B illustrates high-powered wireless devices 934, 935 respectively outside and inside a potential interference zone 950. High-powered wireless device 934 is illustrated as being in communication with access node 910. While high-powered wireless device 934 is outside potential interference zone 950, it communicates with access node 910 via high-powered uplink transmissions 944. High-powered uplink transmissions 944 may be necessary for high-powered wireless device 934 to communicate with access node 910 based on, for example, a distance from access node 910. However, high-powered wireless device 935 is illustrated as being in communication with access node 920, and is located within a potential interference zone 950. Thus, a high-powered transmission mode for wireless device 935 is deactivated as described above, and wireless device 935 is instructed to transmit uplink transmissions 945 using a standard power level.

The methods, systems, devices, networks, access nodes, and equipment described above may be implemented with, contain, or be executed by one or more computer systems and/or processing nodes. The methods described above may also be stored on a non-transitory computer readable medium. Many of the elements of system 100 may be, comprise, or include computers systems and/or processing nodes. This includes, but is not limited to: access nodes 110, 120, controller node 104, and/or network 101.

Figure 10:
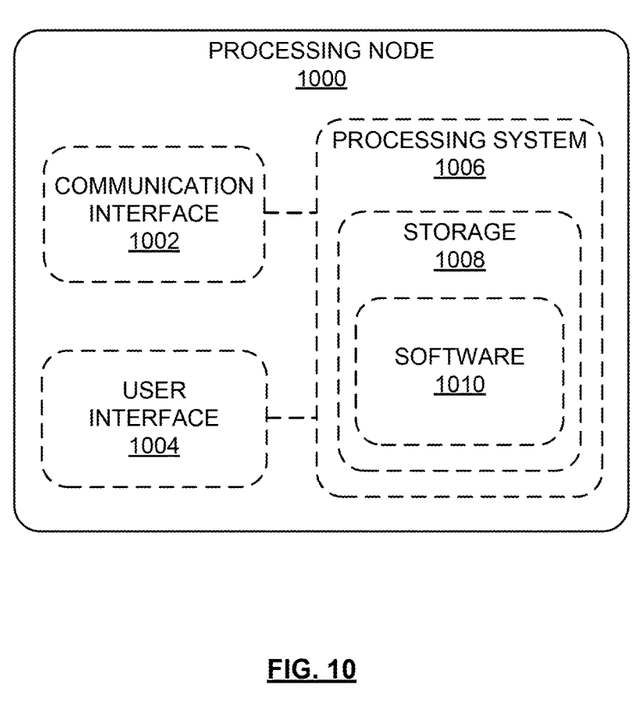
FIG. 10 depicts an exemplary processing node for minimizing interference in a wireless network.

FIG. 10 depicts an exemplary processing node for controlling a transmit power of wireless devices in a wireless network. Processing node 1000 comprises a communication interface 1002, user interface 1004, and processing system 1006 in communication with communication interface 1002 and user interface 1004. Processing system 1006 includes storage 1008, which can comprise a disk drive, flash drive, memory circuitry, or other memory device. Storage 1008 can store software 1010 which is used in the operation of the processing node 1000. Storage 1008 may include a disk drive, flash drive, data storage circuitry, or some other memory apparatus. For example, storage 1008 may include a buffer. Software 1010 may include computer programs, firmware, or some other form of machine-readable instructions, including an operating system, utilities, drivers, network interfaces, applications, or some other type of software. For example, software 1010 may include a module for performing transmit power control operations described herein. Processing system 1006 may include a microprocessor and other circuitry to retrieve and execute software 1010 from storage 1008. Processing node 1000 may further include other components such as a power management unit, a control interface unit, etc., which are omitted for clarity. Communication interface 1002 permits processing node 1000 to communicate with other network elements. User interface 1004 permits the configuration and control of the operation of processing node 1000.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for minimizing interference in a wireless network, the method comprising:
    determining that a high-powered wireless device assigned to a first power class is located in a potential interference zone of a coverage area of an access node, wherein the potential interference zone is determined based on interference caused to uplink transmissions from one or more wireless devices assigned to a second power class; and
    deactivating a high-powered transmission mode of the high-powered wireless device,
    wherein deactivating the high-powered transmission mode of the high-powered wireless device comprises transmitting an instruction from the access node to the high-powered wireless device to transmit data using a standard maximum transmission power level, and
    wherein the high-powered transmission mode utilizes a first transmission power level that is associated with the first power class.

2. The method of claim 1, further comprising transmitting the standard maximum transmission power level to the high-powered wireless device in a downlink control indicator message.

3. The method of claim 1, wherein the standard maximum transmission power level is associated with the second power class.

4. The method of claim 3, further comprising scheduling an amount of uplink resources for the high-powered wireless device, the amount of uplink resources being associated with the second power class.

5. The method of claim 4, wherein scheduling the amount of uplink resources for the high-powered wireless device comprises receiving a power headroom level from the high-powered wireless device, and scheduling the amount of uplink resources based on a combination of the power headroom level and the standard maximum transmission power level.

6. The method of claim 4, further comprising assigning, to the high-powered wireless device, a modulation and coding scheme (MCS) associated with the second power class.

7. The method of claim 3, further comprising defining the potential interference zone as a region of the coverage area where a signal-to-interference-plus-noise ratio (SINR) of the uplink transmissions transmitted by the one or more wireless devices assigned to the second power class meets a SINR threshold.

8. The method of claim 7, wherein the region of the coverage area is based on a location of each of the one or more wireless devices assigned to the second power class.

9. A system for minimizing interference in a wireless network, the system comprising:
    an access node; and
    a processor coupled to the access node, the processor for configuring the access node to perform operations comprising:
    determining a coverage area within which the access node can receive uplink transmissions transmitted using a standard transmit power level based on uplink transmissions transmitted by one or more wireless devices utilizing the standard transmit power level; and
    instructing one or more high-powered wireless devices within the coverage area to switch from using a high-powered transmission mode to using a standard transmit power level;
    wherein the high powered transmission mode utilizes a transmit power level that is higher than the standard transmit power level.

10. The system of claim 9, wherein determining the coverage area comprises identifying a subset of the uplink transmissions that have a low signal-to-interference-plus-noise ratio (SINR); obtaining locations of wireless devices that transmitted the subset of uplink transmissions; and equating the coverage area to the locations.

11. The system of claim 10, wherein the coverage area comprises a range of locations, and wherein deactivating the high-powered transmission mode for the one or more high-powered wireless devices is triggered upon determining that the one or more high-powered wireless devices enters the coverage area.

12. The system of claim 11, wherein the operations further comprise activating the high-powered transmission mode for the one or more high-powered wireless devices upon determining that the one or more high-powered wireless devices leaves the coverage area.

13. The system of claim 10, wherein deactivating the high-powered transmission mode for the one or more high-powered wireless devices comprises instructing the one or more high-powered wireless devices to transmit data using the standard transmission power level.

14. The system of claim 13, wherein deactivating the high-powered transmission mode further comprises scheduling uplink resources for the one or more high-powered wireless devices based on the standard transmission power level.

15. A processing node for minimizing interference in a wireless network, the processing node being configured to perform operations comprising:
    identifying a high-powered wireless device (HPUE) in a potential interference region of a coverage area of an access node, wherein the potential interference region is determined based on interference caused to uplink transmissions from one or more standard-powered wireless devices;
    deactivating a high-powered transmission mode of the HPUE, wherein deactivating the high-powered transmission mode comprises transmitting a first instruction from the access node to the HPUE to switch from using a high transmission power to using a standard transmission power that is lower than the high transmission power;
    determining that the HPUE moves outside the potential interference region; and
    activating the high-powered transmission mode, wherein activating the high-powered transmission mode comprises transmitting a second instruction from the access node to the HPUE to switch from using the standard transmission power to using the high transmission power.

16. The processing node of claim 15, wherein the HPUE is assigned to a transmission power class enabling the HPUE to use a higher transmit power and using more uplink resources than the standard-powered wireless devices.

17. The processing node of claim 16, wherein the potential interference region comprises any region of the coverage area from where the standard-powered wireless devices can transmit data to the access node.

18. The processing node of claim 16, wherein deactivating the high-powered transmission mode of the HPUE comprises instructing the HPUE to utilize the same transmit power and uplink resources as the standard-powered wireless devices.

19. The processing node of claim 16, wherein determining that the HPUE moves outside the potential interference region is based on the HPUE moving further away from the access node, and wherein activating the high-powered transmission mode of the HPUE comprises instructing the HPUE to utilize the higher transmit power and more uplink resources than the standard-powered wireless devices.

* * * * *